United States Patent
Kuwata

(10) Patent No.: US 8,840,251 B2
(45) Date of Patent: Sep. 23, 2014

(54) LIGHT COLLECTING OPTICAL SYSTEM AND PROJECTION-TYPE IMAGE DISPLAY APPARATUS

(75) Inventor: Muneharu Kuwata, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 265 days.

(21) Appl. No.: 13/389,584

(22) PCT Filed: Aug. 24, 2010

(86) PCT No.: PCT/JP2010/005207
§ 371 (c)(1),
(2), (4) Date: Feb. 8, 2012

(87) PCT Pub. No.: WO2011/024442
PCT Pub. Date: Mar. 3, 2011

(65) Prior Publication Data
US 2012/0140186 A1    Jun. 7, 2012

(30) Foreign Application Priority Data
Aug. 25, 2009    (JP) .................... 2009-194534

(51) Int. Cl.
G03B 21/00    (2006.01)
G03B 21/20    (2006.01)
G03B 33/12    (2006.01)
H04N 9/31    (2006.01)

(52) U.S. Cl.
CPC ........ *G03B 21/2093* (2013.01); *G03B 21/2006* (2013.01); *G03B 33/12* (2013.01); *H04N 9/317* (2013.01); *H04N 9/3111* (2013.01)
USPC ............................................ 353/33; 348/771

(58) Field of Classification Search
USPC .................. 353/33, 31; 348/771; 362/231
See application file for complete search history.

(56) References Cited

U.S. PATENT DOCUMENTS

| 6,882,379 | B1 | 4/2005 | Yokoyama et al. | |
| 7,212,344 | B2* | 5/2007 | Keuper et | 359/618 |
| 2005/0036119 | A1* | 2/2005 | Ruda et al. | 353/99 |
| 2005/0190582 | A1 | 9/2005 | Keuper et al. | |
| 2006/0001838 | A1* | 1/2006 | Yoshii et al. | 353/31 |

(Continued)

FOREIGN PATENT DOCUMENTS

| CN | 1354807 A | 11/2006 |
| CN | 101496170 A | 7/2008 |

(Continued)

*Primary Examiner* — Francis M Legasse, Jr.
*Assistant Examiner* — Jerry Brooks
(74) *Attorney, Agent, or Firm* — Birch, Stewart, Kolasch & Birch, LLP

(57) ABSTRACT

A light collecting optical system includes surface-emitting light sources, collimate lenses, and a condenser lens. Light emitting surfaces of the surface-emitting light sources have a rectangular shape of the same size as each other, and have a similar figure to an incident surface of an integrator rod, the collimate lenses are disposed so that the optical distances from the collimate lenses to the condenser lens are approximately the same, and the surface-emitting light sources are disposed so that the optical distances Lr, Lg and Lb from the light emitting surfaces to the collimate lenses satisfy Lb<Lg<Lr and so that images of the light emitting surfaces, which are formed on the incident surface of the integrator rod by the collimate lenses and the condenser lens, have approximately the same size.

18 Claims, 6 Drawing Sheets

(56) References Cited

U.S. PATENT DOCUMENTS

| | | | |
|---|---|---|---|
| 2006/0238720 A1* | 10/2006 | Lee et al. | 353/38 |
| 2008/0174742 A1 | 7/2008 | Ito | |
| 2008/0297730 A1* | 12/2008 | Park et al. | 353/31 |
| 2009/0086212 A1* | 4/2009 | Kitamura | 356/460 |

FOREIGN PATENT DOCUMENTS

| | | |
|---|---|---|
| CN | 101315405 A | 12/2008 |
| JP | 7-226825 A | 8/1995 |
| JP | 2000-056410 A | 2/2000 |
| JP | 2002-189263 A | 7/2002 |
| JP | 2004-138669 A | 5/2004 |
| JP | 2004-341107 A | 12/2004 |
| JP | 2005-242364 A | 9/2005 |
| JP | 2006-171662 A | 6/2006 |
| JP | 2007-052231 A | 3/2007 |
| JP | 2007-114603 A | 5/2007 |
| JP | 2007-178672 A | 7/2007 |
| JP | 2007-206668 A | 8/2007 |
| JP | 2008-003270 A | 1/2008 |
| JP | 2008-170966 A | 7/2008 |
| JP | 2008-176195 A | 7/2008 |
| JP | 2008-216923 A | 9/2008 |
| JP | 2008-281829 A | 11/2008 |
| TW | 200541109 A | 8/2005 |
| WO | WO 2007/108504 A1 | 9/2007 |
| WO | WO 2008/016895 A2 | 2/2008 |

* cited by examiner

LIGHT COLLECTING OPTICAL SYSTEM AND PROJECTION-TYPE IMAGE DISPLAY APPARATUS

TECHNICAL FIELD

The present invention relates to a light collecting optical system and a projection-type image display apparatus using the same.

BACKGROUND ART

Conventionally, a lamp light source has been mainly used as a light source of a projection-type image display apparatus. However, the lamp light source has a defect that it has a small quantity of red light, a short lifespan, and so on. Thus, in recent years, in place of the lamp light source, a surface-emitting light source such as a light emitting diode (LED) which has a lifespan longer than that of the lamp light source tends to be used. Since light emitted from the LED has a narrow wavelength range, the light source of the projection-type image display apparatus can achieve a wide color reproduction range by combining LEDs of red (R), green (G) and blue (B) colors.

For example, Patent Document 1 proposes an illumination system which uses LEDs of R, G, B colors and an integrator rod. In this system, respective colors of light beams emitted from the LEDs of the respective colors are collimated by collimate lenses corresponding to the respective colors, the collimated light beams are synthesized by a dichroic mirror or the like, and the synthesized light is focused on an incident surface of the integrator rod by a common condenser lens.

PRIOR ART DOCUMENT

Patent Document

PATENT DOCUMENT 1: Japanese Patent Kokai Publication No. 2005-242364

SUMMARY OF THE INVENTION

Problems to be Solved by the Invention

However, a longitudinal chromatic aberration is generated due to a difference in characteristic that the shorter the wavelength is, the higher the refractive index of the glass material is. For this reason, even when the collimate lenses of the respective colors provided for the LEDs of the respective colors have the same structure and distances from the light emitting surfaces of the LEDs of the respective colors to the respective color collimate lenses are made the same; the collimate lenses causes generation of a longitudinal chromatic aberration and the condenser lens causes the longitudinal chromatic aberration to be increased. This causes secondary light source images on the light emitting surfaces of the LEDs formed in the vicinity of the incident surface of the integrator rod to have imaged positions different for the respective colors. As a result, there occurs a problem that light collecting efficiencies at the incident surface of the integrator rod become different for the different colors. For example, when the light collecting efficiency of the green-color light is tried to be maximized, the light collecting efficiencies of the red-color light and blue-color light are decreased, thus undesirably leading to the fact that a light utilization efficiency as a whole is reduced.

Furthermore, even when light beams emitted from the LEDs of the respective colors are completely parallel by the collimate lenses of the respective colors having different structures, the condenser lens causes generation of a longitudinal chromatic aberration. Thus, there still exists a problem that a light utilization efficiency is reduced.

Moreover, it is conceivable to solve the problem of the chromatic aberration by employing achromatic lenses for the collimate lenses and the condenser lens. However, increase in the number of used lenses causes the system to be complicated, thus involving another problem that a product cost becomes higher.

The present invention is made for the purpose of solving the above-mentioned problems in the prior art, and an object of the present invention is to provide a light collecting system having a high light utilization efficiency while having a simple structure, and a projection-type image display apparatus using the light collecting system.

Means of Solving the Problems

A light collecting optical system according to the present invention includes: a red-color surface-emitting light source having a red-color light emitting surface and emitting red-color light from the red-color light emitting surface; a green-color surface-emitting light source having a green-color light emitting surface and emitting green-color light from the green-color light emitting surface; a blue-color surface-emitting light source having a blue-color light emitting surface and emitting blue-color light from the blue-color light emitting surface; a red-color collimate lens having a positive power and collimating the red-color light emitted from the red-color light emitting surface; a green-color collimate lens having a positive power and collimating the green-color light emitted from the green-color light emitting surface; a blue-color collimate lens having a positive power and collimating the blue-color light emitted from the blue-color light emitting surface; a light synthesis means for synthesizing the red-color light that passed through the red-color collimate lens, the green-color light that passed through the green-color collimate lens, and the blue-color light that passed through the blue-color collimate lens; a condenser lens having a positive power and condensing the synthesized light; and a light-intensity-distribution uniformizing element having an incident surface for receiving light condensed by the condenser lens and having an exit surface for outputting light, a light intensity distribution of which is uniformized; wherein: the red-color light emitting surface, the green-color light emitting surface and the blue-color light emitting surface have a rectangular shape having the same size and a similar figure to the incident surface of the light-intensity-distribution uniformizing element; the red-color collimate lens, the green-color collimate lens and the blue-color collimate lens have the same structure; the red-color collimate lens, the green-color collimate lens and the blue-color collimate lens are arranged so that an optical distance from the red-color collimate lens to the condenser lens, an optical distance from the green-color collimate lens to the condenser lens and an optical distance from the blue-color collimate lens to the condenser lens become approximately same; and the red-color surface-emitting light source, the green-color surface-emitting light source and the blue-color surface-emitting light source are arranged so that the red-color light optical distance from the red-color light emitting surface to the red-color collimate lens is longer than the green-color light optical distance from the green-color light emitting surface to the green-color collimate lens, the green-color light optical distance is longer than the blue-color light optical distance from the blue-color light emitting surface to the blue-color collimate lens, and a secondary light source image of the red-color light emitting surface imaged on the incident surface of the light-intensity-distribution uniformizing element by the red-color collimate lens and the condenser lens, a secondary light source image of the green-color light emitting surface imaged on the incident surface of the light-intensity-distribution uniformizing element by the green-color collimate lens and the condenser lens, and a secondary light source image of the blue-color light emitting surface imaged on the incident surface of the light-intensity-distribution uniformizing element by the blue-color collimate lens and the condenser lens have the same size.

Furthermore, a projection-type image display apparatus according to the present invention includes: the above-mentioned light collecting optical system; an image display element for receiving light emitted from the light collecting optical system and modulating the received light to generate video light; and a projection optical system for enlarging and projecting the video light generated by the image display element.

Effects of the Invention

In the light collecting optical system according to the present invention, the red-color surface-emitting light source, the green-color surface-emitting light source and the blue-color surface-emitting light source are arranged so that an optical distance from the red-color light emitting surface to the red-color collimate lens is longer than an optical distance from the green-color light emitting surface to the green-color collimate lens, so that the green-color light optical distance is longer than the blue-color light optical distance from the blue-color light emitting surface to the blue-color collimate lens, and so that a secondary light source image on the red-color light emitting surface, a secondary light source image on the green-color light emitting surface, and a secondary light source image on the blue-color light emitting surface have the same size. As a result, in spite of a simple structure, the light collecting optical system can achieve a high light utilization efficiency without involving a light quantity loss in the light-intensity-distribution uniformizing element.

Furthermore, the projection-type image display apparatus according to the present invention can display a high-brightness image using the light collecting optical system of a simple structure.

MODE FOR CARRYING OUT THE INVENTION

First Embodiment

Figure 1:
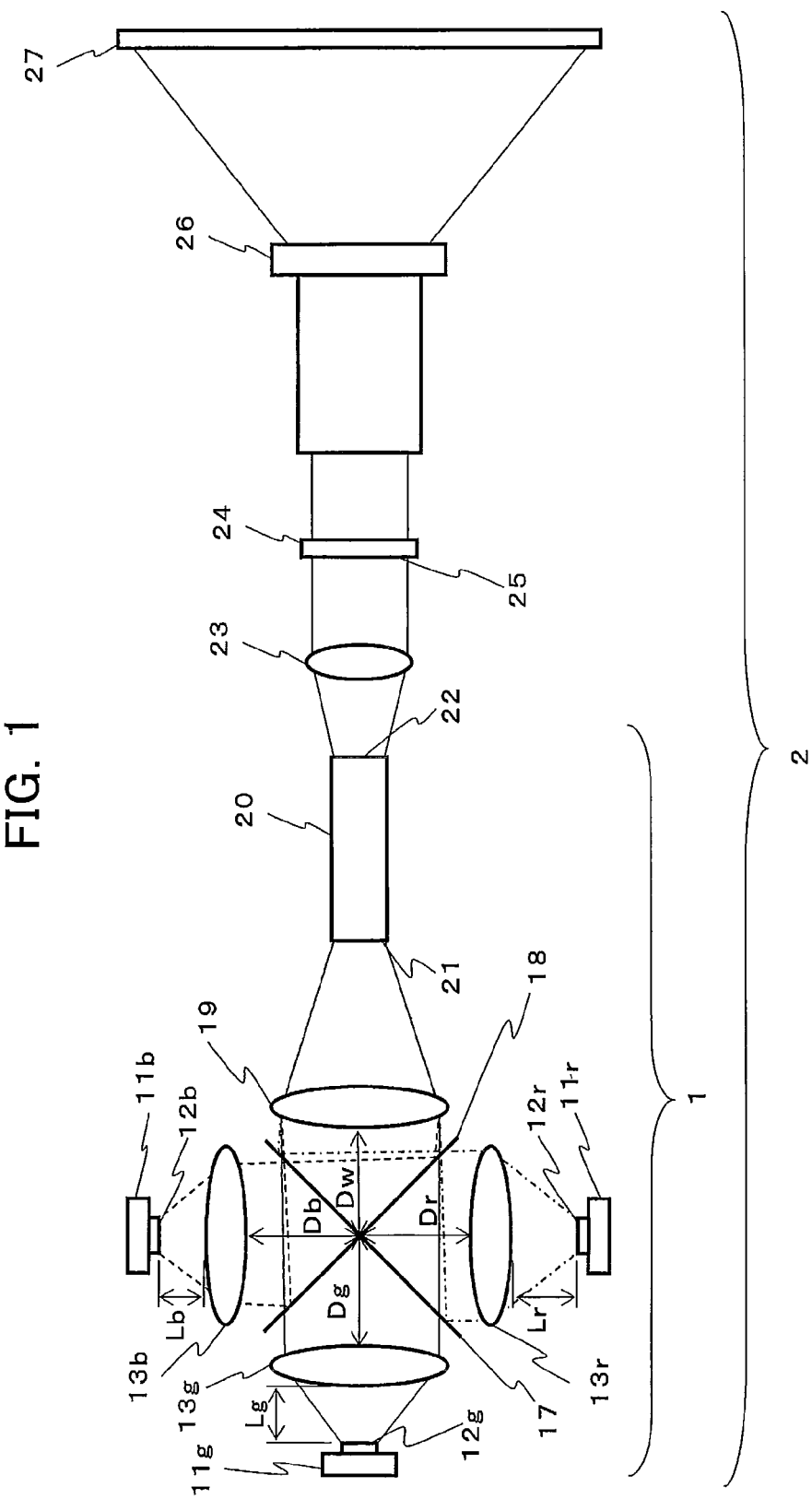
FIG. 1 is a diagram schematically showing an arrangement of a light collecting optical system and a projection-type image display apparatus according to a first embodiment of the present invention.

FIG. 1 is a diagram schematically showing an arrangement of a light collecting optical system 1 and an arrangement of a projection-type image display apparatus 2 according to a first embodiment of the present invention. As shown in FIG. 1, the light collecting optical system 1 according to the first embodiment includes a red-color surface-emitting light source 11r having a red (R) color light emitting surface 12r and emitting red-color light from the red-color light emitting surface 12r; a green-color surface-emitting light source 11g having a green (G) color light emitting surface 12g and emitting green-color light from the green-color light emitting surface 12g; and a blue-color surface-emitting light source 11b having a blue (B) color light emitting surface 12b and emitting blue-color light from blue-color light emitting surface 12b. LEDs, electroluminescence elements, semiconductor lasers or the like can be employed as the surface-emitting light sources 11r, 11g and 11b. However, the following explanation will be made in connection with a case where the surface-emitting light sources are LEDs.

The light collecting optical system 1 according to the first embodiment includes a red-color collimate lens 13r having a positive power and collimating (i.e., making light approximately parallel) red-color light emitted from the red-color light emitting surface 12r; a green-color collimate lens 13g having a positive power and collimating (i.e., making light approximately parallel) green-color light emitted from the green-color light emitting surface 12g; and a blue-color collimate lens 13b having a positive power and collimating (i.e., making light approximately parallel) blue-color light emitted from the blue-color collimate lens 12b.

The light collecting optical system 1 according to the first embodiment also includes a light synthesis means for synthesizing red-color light that passed through the red-color collimate lens 13r, green-color light that passed through the green-color collimate lens 13g, and blue-color light that passed through the blue-color collimate lens 13b. In FIG. 1, the light synthesis means is made of, for example, a cross dichroic mirror including two plates of dichroic mirrors 17 and 18 arranged to be perpendicular to each other. The dichroic mirrors 17 and 18 has such a characteristic as to pass or reflect light having a specific wavelength band therethrough or thereby. In the first embodiment, the light synthesis means includes a dichroic mirror 17 for passing green-color and blue-color light therethrough and reflecting red-color light thereby, and a dichroic mirror 18 for passing red-color and green-color light therethrough and reflecting blue-color light thereby. Since the cross dichroic mirror having the dichroic mirrors 17 and 18 can have a mirror arrangement space small when compared with a case where two plates of dichroic mirrors are arranged to be spaced from each other; a light collecting optical system can be made compact in size. In this connection, the light synthesis means is not limited to the illustrated arrangement.

The light collecting optical system 1 further includes a condenser lens 19 having a positive power and collecting light synthesized by the light synthesis means, and an integrator rod 20 as a light-intensity-distribution uniformizing element having an incident surface 21 for receiving light collected by the condenser lens 19 and an exit surface 22 for outputting light, a light intensity distribution of which is uniformized. The condenser lens 19, which is commonly used to R, G, B color light, functions to receive light synthesized by the dichroic mirrors 17 and 18 and focus the synthesized light on the incident surface 21 of the integrator rod 20 at a desired angle. The integrator rod 20 is made of a rectangular column of glass, a cross sectional view of which is rectangular. The incident surface 21 has a rectangular shape that has a similar figure to the color light emitting surfaces 12r, 12g and 12b of the R, G, B color surface-emitting light sources 11r, 11g and 11b and also to an image display element (shown by reference numeral 24 in FIG. 1). Light incident into the incident surface 21 of the integrator rod 20 is propagated to the interior of the integrator rod while repeating its total reflection at an interface between the glass and air, and each color light is uniformized and then emitted from the exit surface 22. In this connection, the light-intensity-distribution uniformizing element is not limited to the integrator rod 20, but may be an element having another structure.

In the first embodiment, the red-color emitting surfaces 12r, the green-color emitting surfaces 12g and the blue-color light emitting surface 12b have the same size and the same rectangular planar shape, and have a similar figure to the incident surface 21 of the integrator rod 20. The 'similar figure' as stated herein includes not only a complete similar figure but also an approximately similar figure. Furthermore, the light emitting surfaces, 12r, 12g and 12b have an approximately uniform brightness throughout the entire light emitting surface.

The red-color collimate lens 13r, the green-color collimate lens 13g and the blue-color collimate lens 13b have the same structure and therefore have the same optical performance. The collimate lenses 13r, 13g and 13b receive light emitted from the light emitting surfaces 12r, 12g and 12b with a large spread angle, and convert it into light with a spread angle smaller than the spread angle of light emitted from the light emitting surfaces 12r, 12g and 12b of the surface-emitting light sources 11r, 11g and 11b. Each of the red-color collimate lens 13r, the green-color collimate lens 13g, the blue-color collimate lens 13b and the condenser lens 19 are made of, for example, one or more sheets of lenses and are made of the same glass material.

Furthermore, in the first embodiment, the red-color collimate lens 13r, the green-color collimate lens 13g, the blue-color collimate lens 13b and the condenser lens 19 are arranged so that an optical distance (Dr+Dw) from the red-color collimate lens 13r to the condenser lens 19, an optical distance (Dg+Dw) from the green-color collimate lens 13g to the condenser lens 19, and an optical distance (Db+Dw) from the blue-color collimate lens 13b to the condenser lens 19 become the same (or approximately the same). As shown in FIG. 1, Dr denotes a distance from the red-color collimate lens 13r to an intersection point between the dichroic mirrors 17 and 18, Dg denotes a distance from the green-color collimate lens 13g to an intersection point between the dichroic mirrors 17 and 18, Db denotes a distance from the blue-color collimate lens 13b to an intersection point between the dichroic mirrors 17 and 18, and Dw denotes a distance from an intersection point between the dichroic mirrors 17 and 18 to the condenser lens 19.

Moreover, the first embodiment, the red-color surface-emitting light source 11r, the green-color surface-emitting light source 11g and the blue-color surface-emitting light source 11b are arranged so that an optical distance Lr from the red-color light emitting surface 12r to the red-color collimate lens 13r is longer than an optical distance Lg from the green-color light emitting surface 12g to the green-color collimate lens 13g, and so that the green-color light optical distance Lg is longer than an optical distance Lb from the blue-color light emitting surface 12b to the blue-color collimate lens 13b (that is, so that a relation of Lb<Lg<Lr is satisfied). In addition, the red-color surface-emitting light source 11r, the green-color surface-emitting light sources 11g and the blue-color surface-emitting light source 11b are arranged so that a secondary light source image of the red-color light emitting surface 12r focused on the incident surface 21 of the integrator rod 20 by the red-color collimate lens 13r and the condenser lens 19, a secondary light source image of the green-color light emitting surface 12g focused on the incident surface 21 of the integrator rod 20 by the green-color collimate lens 13g and the condenser lens 19, a secondary light source image of the blue-color light emitting surface 12b focused on the incident surface 21 of the integrator rod 20 by the blue-color collimate lens 13b and the condenser lens 19 have the same size. The 'same size' as used herein includes not only a completely the same size but also approximately the same size.

As shown in FIG. 1, the projection-type image display apparatus 2 also includes the light collecting optical system 1, an illumination optical system 23 for receiving light that was emitted from the light collecting optical system 1 and uniformized in light intensity distribution, an image display element 24 for modulating light that passed through the illumination optical system 23 to generate video light, and a projection optical system 26 for enlarging and projecting the video light generated by the image display element 24 onto a screen 27.

The illumination optical system 23 irradiates a display surface 25 of the image display element 24 with light emitted from the integrator rod 20. At this time, the exit surface 22 of the integrator rod 20 have a conjugate relationship with the display surface 25 of the image display element 24, so that an image of the exit surface 22 of the integrator rod 20 having a uniform brightness is formed on the display surface 25 of the image display element 24. Thus, when the light emitting surfaces 12r (or 12g or 12b) of the surface-emitting light source 11r (or 11g or 11b), the incident surface 21 of the integrator rod 20 and the display surface 25 of the image display element 24 are set to have mutually similar figures, the display surface 25 of the image display element 24 can be efficiently illuminated and a high light utilization efficiency can be achieved.

The image display element 24 is, for example, a transmissive or reflective liquid crystal panel or a DMD (Digital Micro-mirror Device), and has the display surface 25 having a structure, on which a large number of pixels are two-dimensionally arranged. The image display element 24 generates video light by modulating intensity of light emitted from the illumination optical system 23 for each pixel according to a video signal.

The projection optical system 26 is made of a lens or a reflecting mirror or a combination thereof, and enlarges and projects the video light generated by the image display element 24 onto the screen 27 to display an image on the screen.

In the projection-type image display apparatus 2, light beams emitted from the light emitting surfaces 12r, 12g and 12b of the R, G, B-color surface-emitting light sources 11r, 11g and 11b pass through the associated collimate lenses 13r, 13g and 13b, are synthesized by the dichroic mirrors 17 and 18, and then are collected onto the incident surface 21 of the integrator rod 20. Light, a light intensity distribution of which has been uniformized by the integrator rod 20, passes through the illumination optical system 23 including lenses and so on, is irradiated on the image display element 24, and then is modulated by the image display element 24. Image light modulated by the image display element 24 is enlarged and projected by the projection optical system 26 onto the screen 27 to display an image on the screen 27.

Explanation will next be made more in detail about a relationship among the sizes of the light emitting surfaces 12r, 12g and 12b of the surface-emitting light sources 11r, 11g and 11b, the size of the incident surface 21 of the integrator rod 20 and the size of the display surface 25 of the image display element 24. In the first embodiment, the light emitting surfaces 12r, 12g and 12b of the surface-emitting light sources 11r, 11g and 11b have a conjugate relationship with the incident surface 21 of the integrator rod 20; and the exit surface 22 of the integrator rod 20 has a conjugate relationship with the display surface 25 of the image display element 24. Thus, in order to obtain a high light unitization efficiency, it is desirable the light emitting surfaces 12r, 12g and 12b of the surface-emitting light sources 11r, 11g and 11b and the incident surface 21 of the integrator rod 20 have both an approximately similar figure to the image display element 24.

In general, one of concepts to be considered when a light collecting optical system and an illumination optical system are designed is a quantity called Etendue. When the Etendue concept is applied to the light collecting optical system 1 and the projection-type image display apparatus 2 according to the first embodiment and when a luminous intensity distribution of light fluxes emitted from the light emitting surfaces 12r, 12g and 12b of the surface-emitting light sources 11r, 11g and 11b is assumed to be a Lambertian distribution (perfect diffusion); An Etendue of the surface-emitting light sources 11r, 11g and 11b, an Etendue of the integrator rod 20 and an Etendue of the image display element 24 are defined respectively as a product of an area of the light emitting or receiving surface and a solid angle of light emitted from the light emitting surface or received at the light receiving surface, and are expressed by the following equations (1) to (3).

$$Es = As \times \pi \times \sin^2(\theta s) \quad (1)$$

$$Ei = Ai \times \pi \times \sin^2(\theta i) \quad (2)$$

$$El = Al \times \pi \times \sin^2(\theta l) \quad (3)$$

In equation (1), Es denotes an Etendue of the surface-emitting light sources 11r, 11g and 11b, As denotes an area of the light emitting surfaces 12r, 12g and 12b of the surface-emitting light sources 11r, 11g and 11b, θs denotes an angle (acceptance angle) of one of light beams emitted from the light emitting surfaces 12r, 12g and 12b of the surface-emitting light sources 11r, 11g and 11b and accepted by the collimate lenses 13r, 13g and 13b, which is emitted with a largest spread angle with respect to a normal to the light emitting surfaces 12r, 12g and 12b.

In equation (2), Ei denotes an Etendue of the integrator rod 20, Ai denotes an area of the incident surface 21 of the integrator rod 20, θi denotes an angle (converging angle) of one of light beams emitted from the light emitting surfaces 12r, 12g and 12b of the surface-emitting light sources 11r, 11g and 11b with the acceptance angle which is received at the incident surface 21 of the integrator rod 20 with respect to a normal to the incident surface 21 of the integrator rod 20.

In equation (3), El denotes an Etendue of the image display element 24, Al denotes an area of the display surface 25 of the image display element 24, θl denotes an angle (illumination angle) of a light beam directed to the display surface 25 of the image display element 24 after reception at the incident surface 21 of the integrator rod 20 with respect to a normal to the display surface 25. π denotes a ratio of the circumference of a circle to its diameter.

In general, a light collecting optical system and an illumination optical system are designed so that the aforementioned quantities Es, Ei and El have the same value. For example, when it is assumed that the light emitting surfaces 12r, 12g and 12b of the surface-emitting light sources 11r, 11g and 11b have a size of 3 mm×4 mm (5 mm in diagonal size) and that a luminous intensity distribution of light fluxes emitted hemispherically (θs=90 degrees) from the light emitting surfaces 12r, 12g and 12b is a Lambertian distribution; an Etendue of the surface-emitting light sources 11r, 11g and 11b is calculated according to equation (1) as about 37.7, as follows.

$$\begin{aligned} Es &= As \times \pi \times \sin^2(\theta s) \\ &= (3 \times 4) \times \pi \times \sin^2(90°) \\ &= 12 \times \pi \approx 37.7 \end{aligned}$$

In response to it, when the display surface 25 of the image display element 24 is set to have a size 12 mm×16 mm (30 mm in diagonal size) and light for illumination of the display surface 25 of the image display element 24 has an F value of 2.0 (θl≈14.5 degrees); an Etendue of the image display element 24 is calculated according to equation (2) as about 37.7 as follows, which can be made equal to the Etendue of the surface-emitting light sources 11r, 11g and 11b.

$$\begin{aligned} Ei &= Ai \times \pi \times \sin^2(\theta i) \\ &= (12 \times 16) \times \pi \times \sin^2(14.5°) \\ &= 192 \times \pi \times 0.0627 \approx 37.7 \end{aligned}$$

When light received at the incident surface 21 of the integrator rod 20 is assumed to have an F value of 1.0 (θi=30 degrees) and the incident surface 21 of the integrator rod 20 is to have a size of 6 mm×8 mm (10 mm in diagonal size); an Etendue of the integrator rod 20 can be calculated according to equation (3) as about 37.7, as follows, which can be made equal to the Etendue of the surface-emitting light sources 11r, 11g and 11b and also to the Etendue of the image display element 24.

$$\begin{aligned} El &= Al \times \pi \times \sin^2(\theta l) \\ &= (6 \times 8) \times \pi \times \sin^2(30°) \\ &= 48 \times \pi \times 0.25 \approx 37.7 \end{aligned}$$

In the above example, the optical system including the collimate lenses 13r, 13g and 13b and the condenser lens 19 can magnify the light emitting surfaces 12r, 12g and 12b (size: 3 mm×4 mm) of the surface-emitting light sources 11r, 11g and 11b to twice and can focus the light emitting surfaces on the incident surface 21 (size: 6 mm×8 mm) of the integrator rod 20. At this time, if the optical system including the collimate lenses 13r, 13g and 13b and the condenser lens 19 has a large aberration and the secondary light source image of the light emitting surfaces 12r, 12g and 12b of the surface-emitting light sources 11r, 11g and 11b is focused on the incident surface 21 of the integrator rod 20 to be extended beyond the incident surface; light is undesirably illuminated even outside of the incident surface 21 of the integrator rod 20 (light not received at the incident surface 21 is present), thus undesirably generating a light quantity loss.

An optical system including the collimate lenses 13r, 13g and 13b and the condenser lens 19 is set to have a magnification smaller than a desired value, the light emitting surfaces 12r, 12g and 12b of the surface-emitting light sources 11r, 11g and 11b have a smaller secondary light source image and no light is present outside of the incident surface 21 of the integrator rod 20. However, light incident on the incident surface 21 of the integrator rod 20 has a larger converging angle. This causes the illumination angle of light incident on the display surface 25 of the image display element 24 to become larger, which undesirably results in generation of a light quantity loss or in that the projection optical system becomes large in scale. Therefore, the light collecting optical system 1 is required to focus light emitted from the light emitting surfaces 12r, 12g and 12b of the surface-emitting light sources 11r, 11g and 11b at a predetermined acceptance angle into an image with a predetermined converging angle and a predetermined size. When the light is focused into an image of a converging angle exceeding its predetermined value and of a focused size exceeding its predetermined value, a light quantity loss or the like is generated.

In actuality, however, considering that it is difficult to accept all light (as far as θs=90 degrees) emitted from the surface-emitting light sources 11r, 11g and 11b and that the display surface 25 of the image display element 24 is illuminated somewhat broadly beyond the display surface 25 considering a manufacturing error or a uniformity; the acceptance angle, the size of the incident surface 21 of the integrator rod 20 and so on may be suitably optimized according to the specifications of the optical system.

Figure 2:
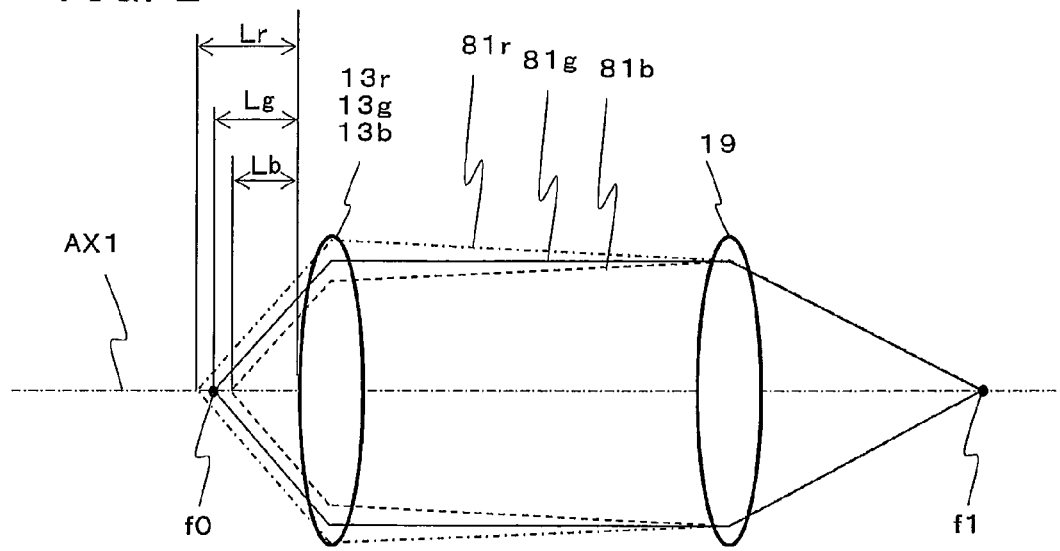
FIG. 2 is a diagram showing an optical path of the light collecting optical system according to the first embodiment.
Figure 3:
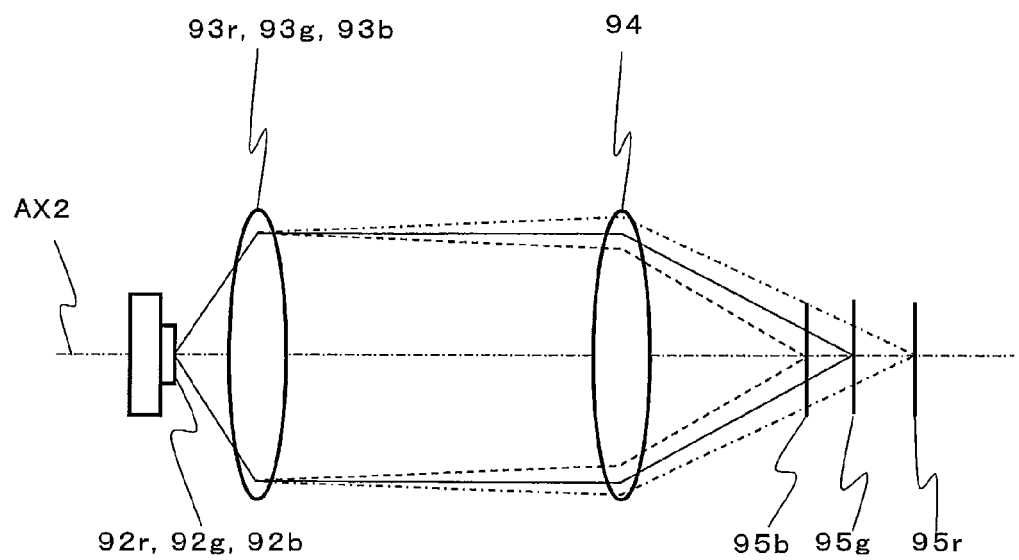
FIG. 3 is a diagram for explaining a longitudinal chromatic aberration in a light collecting optical system as a comparative example.

FIG. 2 is a diagram showing an optical path in the light collecting optical system 1 according to the first embodiment. FIG. 3 is a diagram for explaining a longitudinal chromatic aberration in a light collecting optical system as a comparative example. In FIGS. 2 and 3, for simplicity of explanation, the dichroic mirrors 17 and 18 are not illustrated, optical paths are linearly shown and optical paths for the respective colors are shown to be overlapped. In FIG. 2, reference characters 81r, 81g and 81b denote light beams emitted from the centers of the light emitting surfaces 12r, 12g and 12b of the surface-emitting light sources 11r, 11g and 11b at the same desire acceptance angle respectively; AX1 denotes an optical axis, f0 denotes a front focus in green-color wavelength (emitted from the light emitting surfaces) of the collimate lenses 13r, 13g and 13b; and f1 denotes a back focus in green-color wavelength (emitted from the light emitting surface) of the condenser lens 19.

The collimate lenses 13r, 13g and 13b and the condenser lens 19 are required to image the light emitting surfaces 12r, 12g and 12b of the surface-emitting light sources 11r, 11g and 11b on the incident surface 21 of the integrator rod 20 with a high imaging performance. For this reason, it is preferable from the viewpoint of aberration correction to use a glass material having a relatively high refractive index as the composition materials of the collimate lenses and the condenser lens 19. However, as shown by focusing points 95r, 95g and 95b from light emitting surfaces 92r, 92g and 92b located at the same position in FIG. 3 (comparative example), a glass material having a high refractive index has generally a large dispersion. As a result, collimate lenses 93r, 93g and 93b and a condenser lens 94 having a positive power mutually enhance their longitudinal chromatic aberrations, resulting in generation of a further increased longitudinal chromatic aberration.

In the light collecting optical system 1 according to the first embodiment, meanwhile, distances from the light emitting surfaces 12r, 12g and 12b of the surface-emitting light sources 11r, 11g and 11b to the corresponding collimate lenses 13r, 13g and 13b are set to satisfy a relationship of Lb<Lg<Lr, and the light emitting surface 12g of the surface-emitting light source 11g is arranged so as to include the front focus f0 in the wavelength of green-color light (emitted from the light emitting surface) of the collimate lens 13g (so that the front focus f0 in the wavelength (emitted from the light emitting surface) is position on the light emitting surface 12g). Thus the light beam 81g that passed through the collimate lenses 13r, 13g and 13b is collimated, but the blue-color light beam 81b that passed through the collimate lens 13b is put in its dispersed state and the red-color light beam 81r that passed through the collimate lens 13r is put in its converged state. When respective color light beams 81r, 81g and 81b are directed to the condenser lens 19, the green-color light beam 81g is converged at the back focus f1 in the wavelength of green-color light (emitted from the light emitting surface) of the condenser lens 19 with a desired converging angle. The blue-color light beam 81b in its dispersed state is refracted by the dispersion of the condenser lens 19 with a positive power stronger than the green-color light beam, and then converged at the back focus f1 in the wavelength of a green-color light beam (emitted from the light emitting surface) with the same converging angle as the green-color light beam. Similarly, the red-color light beam 81r in its converged state is refracted by the dispersion of the condenser lens 19 with a positive power stronger than the green-color light beam, and the converged at the back focus f1 in the wavelength of green-color light beam (emitted from the light emitting surface) with the same converging angle as the red-color light beam 81g. As a result, light beams emitted from the light emitting surfaces 12r, 12g and 12b of the surface-emitting light sources 11r, 11g and 11b are converged at the incident surface 21 of the integrator rod 20 with the same converging angle and with the same acceptance angle to the respective color light beams. That is, when the distances Lr, Lg and Lb from the light emitting surfaces 12r, 12g and 12b of the surface-emitting light sources 11r, 11g and 11b to the corresponding collimate lenses 13r, 13g and 13b are set to satisfy a relationship of Lb<Lg<Lr; the longitudinal chromatic aberrations of the collimate lenses 13r, 13g and 13b and the condenser lens 19 can be corrected and the need for employing achromatic lenses for the collimate lenses 13r, 13g and 13b and the condenser lens 19 can be eliminated. Thus, the collimate lenses 13r, 13g and 13b and the condenser lens 19 can be all made of the same glass material. Further, the collimate lenses 13r, 13g and 13b and the condenser lens 19 can be made of a glass material having a large dispersion but having a high refractive index advantageous for aberration correction. As a result, the light collecting optical system 1 can be made with a simple structure and have a high light utilization efficiency.

When it is conceivable as an assumption to proceed a light beam backwards, the incident surface 21 of the integrator rod 20 is imaged at the side of the surface-emitting light sources 11r, 11g and 11b through the condenser lens 19 and the collimate lenses 13r, 13g and 13b. In this case, red, green and blue-color images are formed at the side of the collimate lenses 13r, 13g and 13b opposed to the integrator rod 20, but the red-color image is formed at a position most away from the collimate lenses 13r, 13g and 13b, the green-color image is formed at a position next away therefrom, and the blue-color image is formed nearest thereto. The respective positions of the light emitting surfaces 12r, 12g and 12b of the surface-emitting light sources 11r, 11g and 11b in the light collecting optical system 1 according to the first embodiment correspond to the positions of the red, green and blue images.

Figure 4:
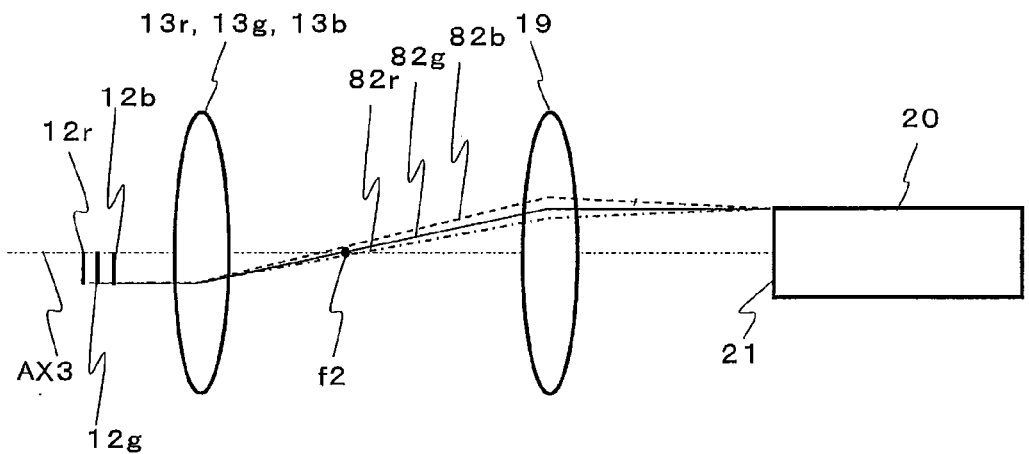
FIG. 4 is a diagram showing a main light beam in the light collecting optical system according to the first embodiment.

FIG. 4 is a diagram showing main light beams emitted from corners of the light emitting surfaces 12r, 12g and 12b of the surface-emitting light sources 11r, 11g and 11b of R, G, B colors. In FIG. 4, elements that are the same as those in FIG. 2, are denoted by the same reference characters. In FIGS. 4, 82r, 82g and 82b denote main light beams emitted from corners of the light emitting surfaces 12r, 12g and 12b of the surface-emitting light sources 11r, 11g and 11b of R, G, B colors respectively, and f2 denotes a back focus in the wavelength of green-color light (emitted from the light emitting surface) of the collimate lenses 13r, 13g and 13b. An optical system including the collimate lenses 13r, 13g and 13b and the condenser lens 19 forms a telecentric optical system toward the side of the surface-emitting light sources 11r, 11g and 11b. The main light beam 82g emitted from the corner of the light emitting surface 12g of the surface-emitting light source 11g in a direction normal to the light emitting surface 12g is refracted by the collimate lens 13g, passes through the back focus f2 in the wavelength of green-color light (emitted from the light emitting surface) of the collimate lens 13g, is directed to the condenser lens 19, is refracted by the condenser lens 19 to be parallel to an optical axis AX3, and then is directed to the corresponding corner of the integrator rod 20. That is, since the condenser lens 19 is arranged so that the front focus in the wavelength of green-color light (emitted from the light emitting surface) of the condenser lens 19 coincides with the back focus f2 in the wavelength of green-color light (emitted from the light emitting surface) of the collimate lens 13g; an optical system including the collimate lenses 13r, 13g and 13b and the condenser lens 19 forms a telecentric optical system even toward the side of the integrator rod 20 with respect to the green-color light.

The main light beam 82b emitted from the corner of the light emitting surface 12b of the blue-color surface-emitting light source 11b to be parallel with the optical axis AX3 is refracted more strongly than the light beam 82g by the collimate lens 13b, passes through the side of the collimate lens 13b closer to the back focus f2 in the wavelength of green-color light (emitted from the light emitting surface) of the blue-color collimate lens 13b, is refracted by the condenser lens 19 more strongly than the green-color light beam 82g, exits the condenser lens 19 in its converged state, and then is intersected by the main green-color light beam 25g on the incident surface 21 of the integrator rod 20.

Similarly, the main light beam 82r emitted from the light emitting surface 12r of the red-color surface-emitting light source 11r to be parallel to the optical axis AX3 is refracted by the red-color collimate lens 13r more weakly than the light beam 82g, passes through the side of the condenser lens 19 closer than the back focus f2 in the wavelength of green-color light (emitted from the light emitting surface) of the collimate lens 13r, is refracted by the condenser lens 19 more weakly than the green-color light beam 82g, exits the condenser lens 19 in its dispersed state, and then is intersected by the main green-color light beam 82g on the incident surface 21 of the integrator rod 20. As a result, in the first embodiment, the secondary light source images of the respective colors having the same size can be focused on the incident surface 21 of the integrator rod 20.

Figure 5:
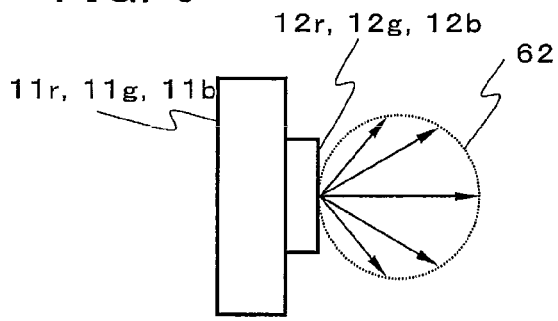
FIG. 5 is a diagram showing a surface-emitting light source, emitted light of which has a Lambertian distribution.
Figure 6:
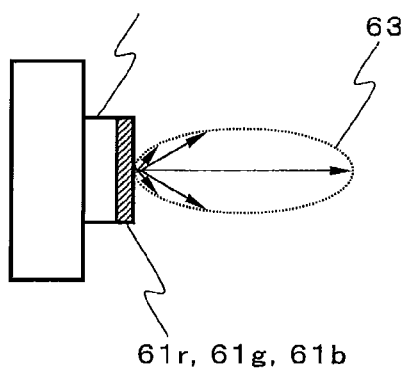
FIG. 6 is a diagram showing a surface-emitting light source having a photonics crystal.

FIGS. 5 and 6 show in schematic form a radiation intensity distributions of light emitted from the light emitting surfaces 12r, 12g and 12b of the surface-emitting light sources 11r, 11g and 11b. FIG. 5 shows the surface-emitting light sources 11r, 11g and 11b having a Lambertian distribution 62, and FIG. 6 shows a distribution 63 having an enhanced directivity of radiation light with provision of photonics crystals 61r, 61g and 61b for the surface-emitting light sources 11r, 11g and 11b of FIG. 5.

As shown in FIG. 5, light emitted from the light emitting surfaces 12r, 12g and 12b of the surface-emitting light sources 11r, 11g and 11b exhibits usually a Lambertian distribution, and is radiated in a spherically shape including the light emitting surfaces 12r, 12g and 12b. It is also already known that the use of the photonics crystals 61r, 61g and 61b enables control of the advancing direction of light incident to the photonics crystals. FIG. 6 corresponds to FIG. 5 but additionally provided with the photonics crystals 61r, 61g and 61b on the light emitting surfaces 12r, 12g and 12b of the surface-emitting light sources of FIG. 5, wherein a radiation intensity of light is enhanced in a direction normal to the light emitting surfaces 12r, 12g and 12b of the surface-emitting light sources 11r, 11g and 11b and in a range close to the vicinity thereof, and is weakened in the other directions.

In the light collecting optical system according to the first embodiment, a photonics crystal can be provided to each of the light emitting surfaces 12r, 12g and 12b of the surface-emitting light sources 11r, 11g and 11b. As mentioned above, the optical system including the collimate lenses 13r, 13g and 13b and the condenser lens 19 forms a telecentric optical system toward the side of the surface-emitting light sources 11r, 11g and 11b. Thus, when the surface-emitting light sources 11r, 11g and 11b using photonics crystals to increase their directivities are employed, light emitted from the light emitting surfaces 12r, 12g and 12b of the surface-emitting light sources 11r, 11g and 11b having high radiation intensities in its normal direction can be preferentially input into the light collecting optical system, so that a higher light utilization efficiency can be obtained.

Figure 7:
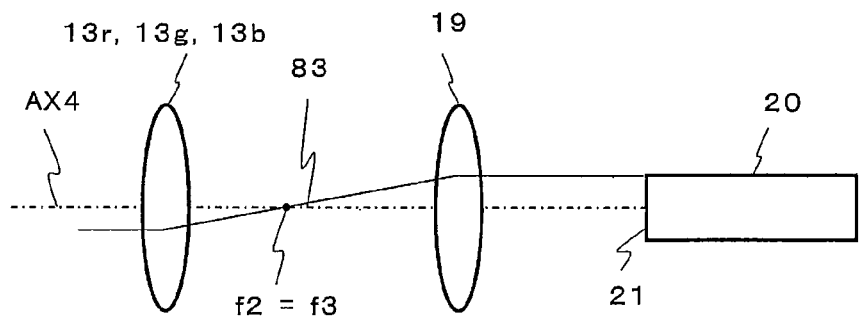
FIG. 7 is a diagram showing a main light beam of the light collecting optical system according to the first embodiment.
Figure 8:
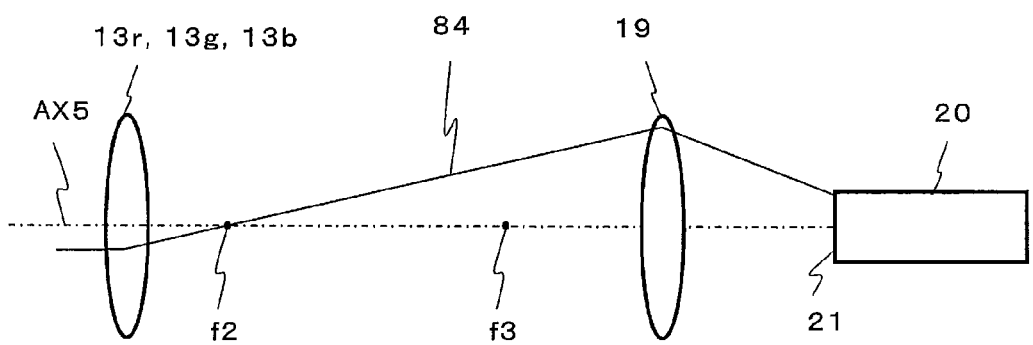
FIG. 8 is a diagram showing a main light beam when a distance between a collimate lens and a condenser lens is made longer.

Explanation will now be made as to the effects of the present invention caused when distances from the collimate lenses 13r, 13g and 13b to the condenser lens 19 are made approximately the same for the respective colors. FIGS. 7 and 8 are diagrams schematically showing optical paths of main light beams when the same collimate lenses 13r, 13g and 13b and the same condenser lens 19 are located at positions different from each other. In FIGS. 7 and 8, elements that are the same as those shown in FIG. 4, are denoted by the same reference characters. In FIGS. 7 and 8, reference characters 83 and 84 denote main light beams emitted from the corners of the light emitting surfaces 12r, 12g and 12b of the surface-emitting light sources 11r, 11g and 11b, reference character f3 denotes a front focus of the condenser lens, and AX4 and AX5 denote optical axes, respectively. In FIG. 7, since the front focus f3 of the condenser lens 19 coincides with the back focus 12 of the collimate lenses 13r, 13g and 13b (f2=f3); after the main light beam 83 exits the condenser lens 19, the light beam becomes parallel to the optical axis AX4 and then directed to the incident surface 21 of the integrator rod. In FIG. 8, on the other hand, since a distance from the collimate lenses 13r, 13g and 13b to the condenser lens 19 is made longer than the distance therebetween in FIG. 7; after the main light beam 84 exits the condenser lens 19, the light beam is directed to the incident surface 21 of the integrator rod in a such a state as to be largely converted with respect to the optical axis AX5. As a result, when the distance from the collimate lenses 13r, 13g and 13b to the condenser lens 19 varies from color to color, the angle of the main light beam directed to the incident surface 21 of the integrator rod 13r, 13g and 13b varies from color to color, thus involving reduction of the light utilization efficiency or deterioration in the brightness uniformity. In the light collecting optical system according to the first embodiment, on the other hand, since the distances from the collimate lenses 13r, 13g and 13b to the condenser lens 19 are made approximately the same for the respective R, G, B colors, a high light utilization efficiency and a uniform brightness can be obtained.

As has been explained above, in spite of having a simple structure, the light collecting optical system 1 and the projection-type image display apparatus 2 according to the first embodiment can achieve a high light utilization efficiency without involving a light quantity loss in the integrator rod 20.

In the above explanation, the green-color surface-emitting light source 11g has been located to be opposed to the condenser lens 19 and the red and blue-color surface-emitting light sources 11r and 11b have been located to face a direction normal to the green-color surface-emitting light source 11g. However, the present invention is not limited to such an example. For example, it is possible to locate the blue-color surface-emitting light source 11b to be opposed to the condenser lens 19 and to locate the red-color and green-color surface-emitting light sources 11r and 11g to face a direction normal to the blue-color surface-emitting light source 11b; or to locate the red-color surface-emitting light source 11r to be opposed to the condenser lens 19 and to locate the green-color and blue-color surface-emitting light sources 11g and 11b to face a direction normal to the red-color surface-emitting light source 11r.

The foregoing explanation has been made in connection with an example wherein the collimate lenses 13r, 13g and 13b and the condenser lens 19 are made of a single piece of convex lens respectively. However, the present invention is not limited to such an example, but may be made of each two or more pieces of lenses according to the specifications of the light collecting optical system such as the acceptance angle, magnification, etc. The collimate lenses 13r, 13g and 13b and the condenser lens 19 are not limited to a spherical lens and may be an aspherical lens or a lens having a free curvature.

Although the above explanation has been made as to the case where the light-intensity-distribution uniformizing element is an integrator rod, the present invention is not limited to this example, but may be another light-intensity-distribution uniformizing element such as a hollow light tunnel.

Further, the above explanation has been made in connection with the case where a dichroic mirror has been used as a means for synthesizing light emitted from the surface-emitting light sources 11r, 11g and 11b of the R, G, B-colors. However, the present invention is not limited to this example, but may be another light synthesis means such as a dichroic prism.

The above explanation has been made in the connection with the case where the front focus and so on are used and is based on mainly a paraxial theory, the present invention may be modified in various ways without departing from the subject matter or gist of the above explanation.

Second Embodiment

Figure 9:
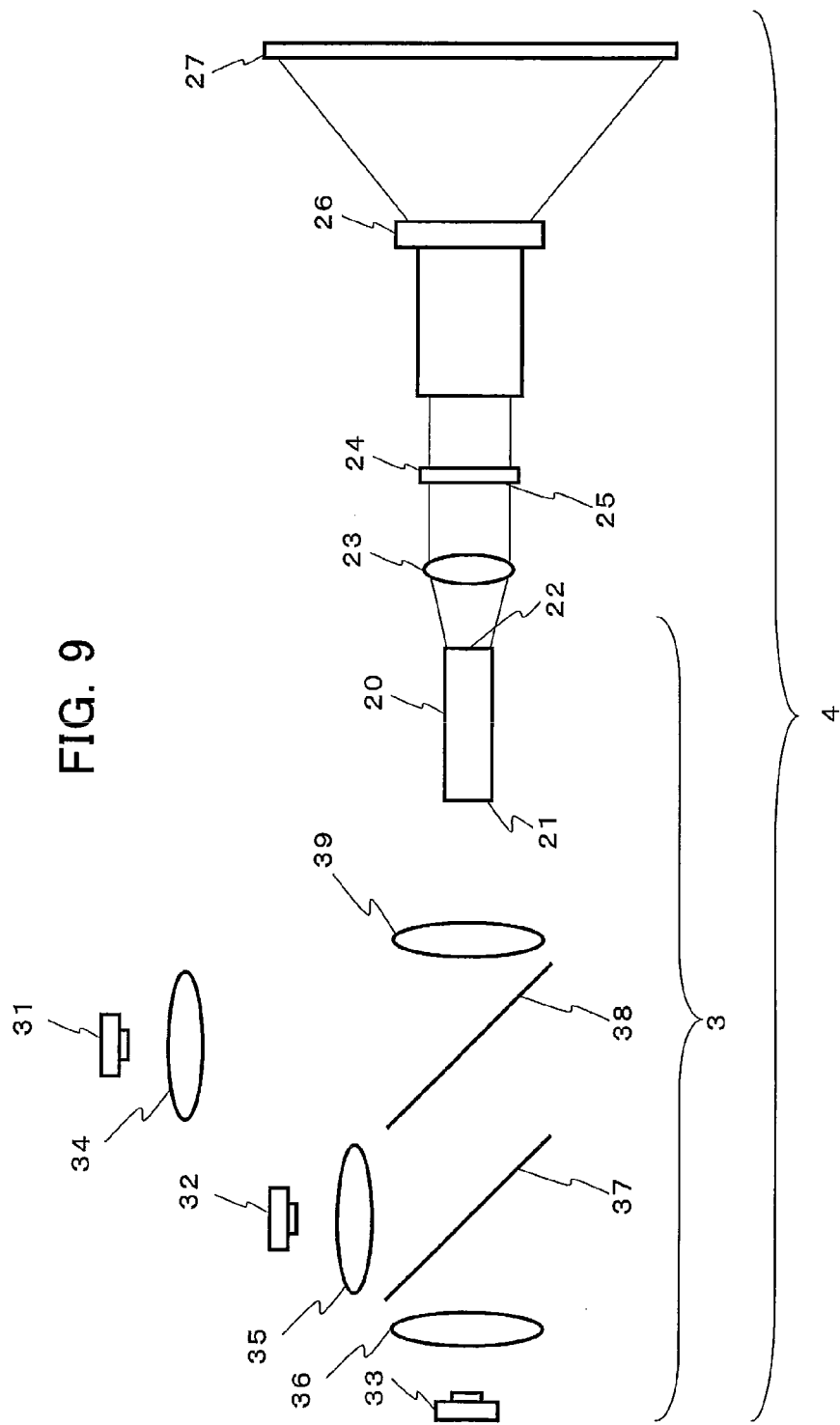
FIG. 9 is a diagram schematically showing an arrangement of a light collecting optical system and a projection-type image display apparatus according to a second embodiment of the present invention.

FIG. 9 is a diagram schematically showing an arrangement of a light collecting optical system 3 and an arrangement of a projection-type image display apparatus 4 according to a second embodiment of the present invention. In FIG. 9, elements that are the same as those in FIG. 1, are denoted by the same reference characters.

In FIG. 9, surface-emitting light sources 31, 32 and 33 are surface-emitting light sources (e.g., LEDs) of R, G, B colors. The surface-emitting light sources 31, 32 and 33 shown in FIG. 9 correspond to, for example, R, G, B surface-emitting light sources. However, the present invention is not limited to such an example, but correspondences between the surface-emitting light sources 31, 32, 33 and the R, G, B colors may be other correspondences. The transmissive and reflective characteristics of the dichroic mirrors 37 and 38 are determined by the colors of light emitted from the surface-emitting light sources 31, 32 and 33. The dichroic mirror 37 has such a wavelength characteristic as to reflect light (first light) of a wavelength band emitted from the light emitting surface of the surface-emitting light source 31 and to pass light (second light) of a wavelength band emitted from the light emitting surface of the surface-emitting light source 32 and also to pass light (third light) of a wavelength band emitted from the light emitting surface of the surface-emitting light source 33. The dichroic mirror 38 has such a wavelength characteristic as to reflect the second light and to pass the third light.

The light collecting optical system 3 according to the second embodiment corresponds to the light collecting optical system 1 according to the first embodiment but the locations of the surface-emitting light sources 31, 32 and 33 and the locations of the dichroic mirrors 37 and 38 are changed from those in the first embodiment. Optical distances from collimate lenses 34, 35 and 36 of the respective colors to a condenser lens 39 (distances from the collimate lenses 34, 35 and 36 of the respective colors to the condenser lens 39 when the dichroic mirrors 37 and 38 are assumed to be removed and all the elements are assumed to be arranged linearly) are made approximately the same among the colors.

Figure 10:
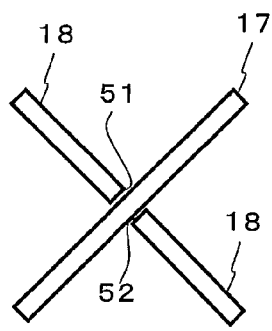
FIG. 10 is a diagram schematically showing a structure of a cross dichroic mirror.

FIG. 10 is a diagram schematically showing a structure of a cross dichroic mirror for comparison. As shown in FIG. 10, the cross dichroic mirror includes a single piece of large mirror 17 (first mirror) and two pieces of small mirrors 18 (second and third mirrors) arranged so as to hold the large mirror 17 between the small mirrors. At this time, end faces 51 and 52 of the second and third mirrors 18 opposed to a face of the first mirror 17 have no wavelength characteristics (that is, have no characteristics as to pass and reflect only light of specific wavelengths). Slight gaps exist between the second and third mirror end faces 51 and 52 and the first mirror 17. Due to the provision of the mirror end faces 51 and 52 and the gaps, there exists such ineffective zones in the cross dichroic mirror that cannot exhibit a desired wavelength characteristic, thus involving a slight of light quantity loss. Meanwhile, the light collecting optical system 3 according to the second embodiment has no ineffective zones and thus does not involve a light quantity loss caused by the mirror end faces and the gaps.

Since in the cross dichroic mirror, one of the dichroic mirrors is divided into the second and third dichroic mirrors 18, an assembling error tends to easily occur, thereby involving a light quantity loss in some cases. On the other hand, since the need for dividing a dichroic mirror can be eliminated in the light collecting optical system 3 according to the second embodiment, there is no probability to incur a light quantity loss resulting from the assembling error.

As has been explained above, the light collecting optical system 3 and the projection-type image display apparatus 4 according to the second embodiment can avoid incurrence of a light quantity loss and achieve a higher light utilization efficiency.

The second embodiment is the same as the first embodiment except for the aforementioned points.

Third Embodiment

Figure 11:
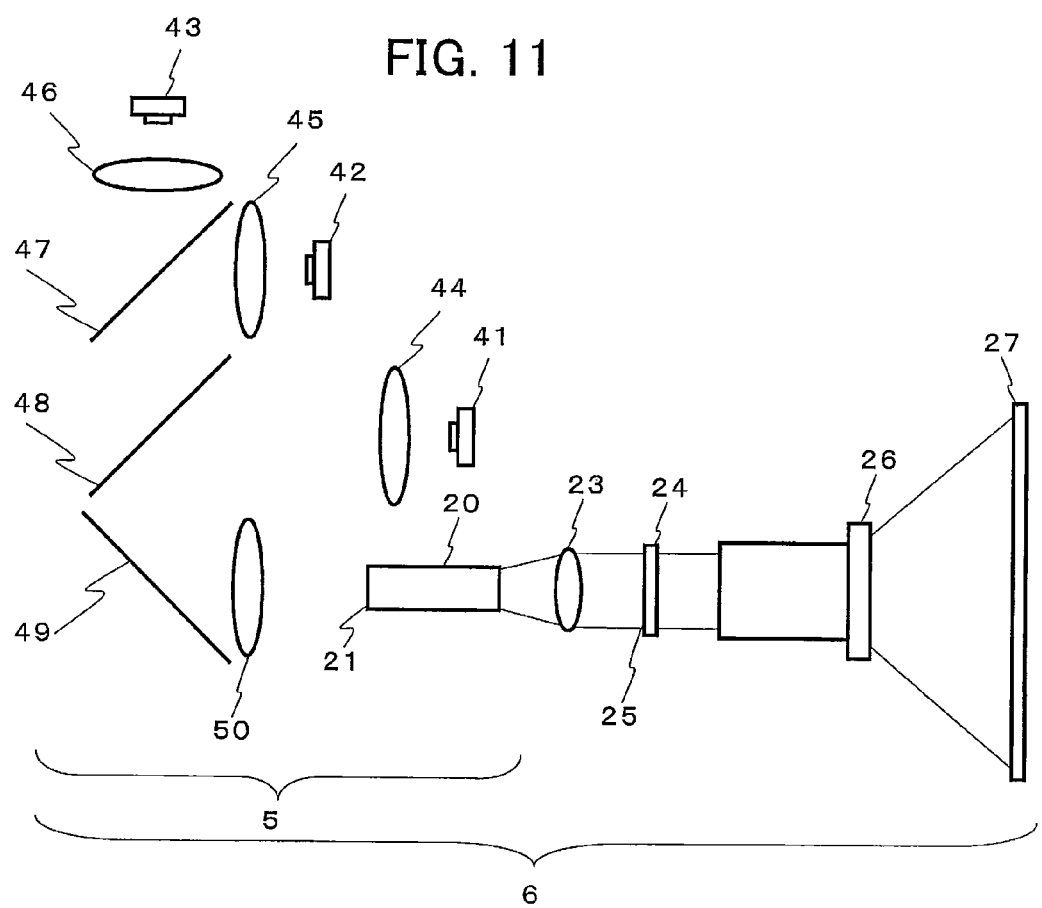
FIG. 11 is a diagram schematically showing an arrangement of a light collecting optical system and a projection-type image display apparatus according to a third embodiment of the present invention.

FIG. 11 is a diagram schematically showing an arrangement of a light collecting optical system 5 and an arrangement of a projection-type image display apparatus 6 according to a third embodiment of the present invention. In FIG. 11, elements that are the same as those in FIG. 1, are denoted by the same reference characters.

In FIG. 11, surface-emitting light sources 41, 42 and 43 are surface-emitting light sources (e.g., LEDs) of R, G, B colors. The surface-emitting light sources 41, 42 and 43 shown in FIG. 11 correspond to, for example, R, G, B surface-emitting light sources respectively. However, the present invention is not limited to this example, but correspondences between the surface-emitting light sources 41, 42, 43 and the R, G, B colors may be other correspondences. The transmissive and reflective characteristics of dichroic mirrors 47 and 48 are determined based on the colors of light emitted from the surface-emitting light sources 41, 42 and 43. The dichroic mirror 47 has such wavelength characteristic as to reflect light (second light) of a wavelength band emitted from the light emitting surface of the surface-emitting light source 43 and to pass light (third light) of a wavelength band emitted from the light emitting surface of the surface-emitting light source 43. The dichroic mirror 48 has such a wavelength characteristic as to reflect light (first light) of a wavelength band emitted from the light emitting surface of the surface-emitting light source 41 and to pass the second and third light. A reflecting mirror 49 directs the first and third light into a condenser lens 50.

The light collecting optical system 5 according to the third embodiment corresponds to the light collecting optical system 3 according to the second embodiment, but is different from the light collecting optical system 3 in that a distance from the dichroic mirror 34 to the dichroic mirror 37 is made long and the condenser lens 50 is located in the optical path thereof to bend the optical path to an approximately right angle. Optical distances from collimate lenses 44, 45 and 46 to the condenser lens 50 (distances from the collimate lenses 44, 45 and 46 of the respective colors to the condenser lens 50 when the dichroic mirrors 47 and 48 and the reflecting mirror 49 are removed and all elements are located linearly) are made approximately the same among the colors. In the third embodiment, since the optical path is bent by the reflecting mirror 49 in a direction normal to the longitudinal direction of the integrator rod 20; the size of the longitudinal direction of the integrator rod 20 in the light collecting optical system 5 can be made small.

As has been explained above, the light collecting optical system 5 and the projection-type image display apparatus 6 of according to the third embodiment can obtain a high light utilization efficiency without incurring a light quantity loss.

The third embodiment is the same as the aforementioned first or second embodiment, except for the other points than the aforementioned points.

DESCRIPTION OF REFERENCE CHARACTERS 1, 3, 5 light collecting optical system; 2, 4, 6 projection-type image display apparatus; 11b, 11g, 11r surface-emitting light source; 12b, 12g, 12r light emitting surface of surface-emitting light source; 13r, 13g, 13b collimate lens; 17, 18, 37, 38, 47, 48 dichroic mirror; 19, 39, 50 condenser lens; 20 integrator rod; incident surface of integrator rod; 22 exit surface of integrator rod; 23 illumination optical system; 24 image display element; 25 display surface of image display element; 26 projection optical system; 27 screen; 31 to 33, 41 to 43 surface-emitting light source; 34 to 36, 44 to 46 collimate lens; 49 mirror; 61r, 61g, 61b photonics crystal.

What is claimed is:

1. A light collecting optical system comprising:
   a first-wavelength surface-emitting light source having a first wavelength light emitting surface and emitting first wavelength light from the first-wavelength light emitting surface;
   a second-wavelength surface-emitting light source having a second wavelength light emitting surface and emitting second wavelength light from the second-wavelength light emitting surface, the second wavelength being shorter than the first wavelength;
   a first-wavelength collimate lens having a positive power and collimating the first wavelength light emitted from the first-wavelength light emitting surface;
   a second-wavelength collimate lens having a positive power and collimating the second wavelength light emitted from the second-wavelength light emitting surface;
   a light synthesis means for synthesizing the first wavelength light that passed through the first-wavelength collimate lens and the second wavelength light that passed through the second-wavelength collimate lens;
   a condenser lens having a positive power and condensing the synthesized light; and
   a light-intensity-distribution uniformizing element having an incident surface for receiving light condensed by the condenser lens and having an exit surface for outputting light, a light intensity distribution of which is uniformized; wherein:
   the first-wavelength light emitting surface and the second-wavelength light emitting surface have a rectangular shape having the same size and a similar figure to the incident surface of the light-intensity-distribution uniformizing element;
   the first-wavelength collimate lens and the second-wavelength collimate lens have the same structure;
   the first-wavelength collimate lens and the second-wavelength collimate lens are arranged so that an optical distance from the first-wavelength collimate lens to the condenser lens and an optical distance from the second-wavelength collimate lens to the condenser lens become approximately same; and
   the first-wavelength surface-emitting light source and the second-wavelength surface-emitting light source are arranged so that the first-wavelength light optical distance from the first-wavelength light emitting surface to the first-wavelength collimate lens is longer than the second-wavelength light optical distance from the second-wavelength light emitting surface to the second-wavelength collimate lens, and a secondary light source image of the first-wavelength light emitting surface imaged on the incident surface of the light-intensity-distribution uniformizing element by the first-wavelength collimate lens and the condenser lens and a secondary light source image of the second-wavelength light emitting surface imaged on the incident surface of the light-intensity-distribution uniformizing element by the second-wavelength collimate lens and the condenser lens have the same size.

2. The light collecting optical system according to claim 1, wherein each of the first-wavelength collimate lens and the second-wavelength collimate lens, and the condenser lens is made of one or more pieces of lenses and is made of the same glass material.

3. The light collecting optical system according to claim 1, wherein the light synthesis means includes two pieces of dichroic mirrors arranged to be perpendicular to each other.

4. The light collecting optical system according to claim 1, wherein the light synthesis means includes two pieces of dichroic mirrors arranged to be parallel to each other.

5. The light collecting optical system according to claim 4, further comprising a reflecting mirror provided between the light synthesis means and the condenser lens to change and direct an optical path of the synthesized light toward the condenser lens.

6. The light collecting optical system according to claim 1, wherein:
the light collecting optical system is a telecentric optical system toward each side of the first-wavelength surface-emitting light source and the second-wavelength surface-emitting light source, and
each of the first-wavelength light emitting surface and the second-wavelength light emitting surface includes a photonics crystal.

7. The projection-type image display apparatus comprising:
the light collecting optical system of claim 1;
an image display element for receiving light emitted from the light collecting optical system and modulating the received light to generate video light; and
a projection optical system for enlarging and projecting the video light generated by the image display element.

8. A light collecting optical system according to claim 1, further comprising:
a third-wavelength surface-emitting light source having a third wavelength light emitting surface and emitting third wavelength light from the third-wavelength light emitting surface, the third wavelength being shorter than the second wavelength; and
a third-wavelength collimate lens having a positive power and collimating the third wavelength light emitted from the third-wavelength light emitting surface; wherein:
the light synthesis means synthesizes the first wavelength light that passed through the first-wavelength collimate lens, the second wavelength light that passed through the second-wavelength collimate lens, and the third wavelength light that passed through the third-wavelength collimate lens;
the first-wavelength light emitting surface, the second-wavelength light emitting surface and the third-wavelength light emitting surface have a rectangular shape having the same size and a similar figure to the incident surface of the light-intensity-distribution uniformizing element;
the first-wavelength collimate lens, the second-wavelength collimate lens and the third-wavelength collimate lens have the same structure;
the first-wavelength collimate lens, the second-wavelength collimate lens and the third-wavelength collimate lens are arranged so that an optical distance from the first-wavelength collimate lens to the condenser lens, an optical distance from the second-wavelength collimate lens to the condenser lens and an optical distance from the third-wavelength collimate lens to the condenser lens become approximately same; and
the first-wavelength surface-emitting light source, the second-wavelength surface-emitting light source and the third-wavelength surface-emitting light source are arranged so that the first-wavelength light optical distance from the first-wavelength light emitting surface to the first-wavelength collimate lens is longer than the second-wavelength light optical distance from the second-wavelength light emitting surface to the second-wavelength collimate lens, the second-wavelength light optical distance is longer than the third-wavelength light optical distance from the third-wavelength light emitting surface to the third-wavelength collimate lens, and a secondary light source image of the first-wavelength light emitting surface imaged on the incident surface of the light-intensity-distribution uniformizing element by the first-wavelength collimate lens and the condenser lens, a secondary light source image of the second-wavelength light emitting surface imaged on the incident surface of the light-intensity-distribution uniformizing element by the second-wavelength collimate lens and the condenser lens, and a secondary light source image of the third-wavelength light emitting surface imaged on the incident surface of the light-intensity-distribution uniformizing element by the third-wavelength collimate lens and the condenser lens have the same size.

9. The light collecting optical system according to claim 8, wherein each of the first-wavelength collimate lens, the second-wavelength collimate lens, the third-wavelength collimate lens, and the condenser lens is made of one or more pieces of lenses and is made of the same glass material.

10. The light collecting optical system according to claim 1, wherein the light synthesis means includes a dichroic mirror.

11. The light collecting optical system according to claim 8, wherein:
the light collecting optical system is a telecentric optical system toward each side of the first-wavelength surface-emitting light source, the second-wavelength surface-emitting light source and the third-wavelength surface-emitting light source, and
each of the first-wavelength light emitting surface, second-wavelength light emitting surface and the third-wavelength light emitting surface includes a photonics crystal.

12. The light collecting optical system according to claim 1, wherein:
the first-wavelength light emitting surface and second-wavelength light emitting surface have a conjugate relationship with the incident surface of the light-intensity-distribution uniformizing element.

13. The light collecting optical system according to claim 8, wherein:
the first-wavelength light emitting surface, the second-wavelength light emitting surface, and the third-wavelength light emitting surface have a conjugate relationship with the incident surface of the light-intensity-distribution uniformizing element.

14. The projection-type image display apparatus according to claim 7, wherein:
the exit surface of the light-intensity-distribution uniformizing element has a conjugate relationship with a display surface of the image display element.

15. The light collecting optical system according to claim 1, wherein:
a product of an area of the first-wavelength light emitting surface and a value of sine squared of a first predetermined angle of a light beam emitted from the first-wavelength light emitting surface is substantially equal to a product of an area of the incident surface of the light-intensity-distribution uniformizing element and a value of sine squared of a second predetermined angle, wherein the second predetermined angle is a converging angle of a light beam emitted from the first-wavelength light emitting surface with the first predetermined angle which is received at the incident surface of the light-intensity-distribution uniformizing element with respect to a normal to the incident surface of the light-intensity-distribution uniformizing element.

16. The light collecting optical system according to claim 1, wherein:
   a product of an area of the second-wavelength light emitting surface and a value of sine squared of a first predetermined angle of a light beam emitted from the second-wavelength light emitting surface is substantially equal to a product of an area of the incident surface of the light-intensity-distribution uniformizing element and a value of sine squared of a second predetermined angle, wherein the second predetermined angle is a converging angle of a light beam emitted from the second-wavelength light emitting surface with the first predetermined angle which is received at the incident surface of the light-intensity-distribution uniformizing element with respect to a normal to the incident surface of the light-intensity-distribution uniformizing element.

17. The light collecting optical system according to claim 8, wherein:
   a product of an area of the third-wavelength light emitting surface and a value of sine squared of a first predetermined angle of a light beam emitted from the third-wavelength light emitting surface is substantially equal to a product of an area of the incident surface of the light-intensity-distribution uniformizing element and a value of sine squared of a second predetermined angle, wherein the second predetermined angle is a converging angle of a light beam emitted from the third-wavelength light emitting surface with the first predetermined angle which is received at the incident surface of the light-intensity-distribution uniformizing element with respect to a normal to the incident surface of the light-intensity-distribution uniformizing element.

18. The projection-type image display apparatus according to claim 7, wherein:
   a product of an area of one of the first-wavelength light emitting surface, second-wavelength light emitting surface, and the third-wavelength light emitting surface and a value of sine squared of a first predetermined angle of one of a light beam emitted from the first-wavelength light emitting surface, the second-wavelength light emitting surface, and the third-wavelength light emitting surface is substantially equal to a product of an area of a display surface of the image display element and a value of sine squared of a second predetermined angle, wherein the second predetermined angle is an illumination angle of a light beam directed to the display surface of the image display element after reception at the incident surface of the light-intensity-distribution uniformizing element with respect to a normal to the display surface of the image display element.

* * * * *